H. D. BRYANT.
LIGHT REGULATING MEANS.
APPLICATION FILED JAN. 30, 1917.
1,237,467.
Patented Aug. 21, 1917.
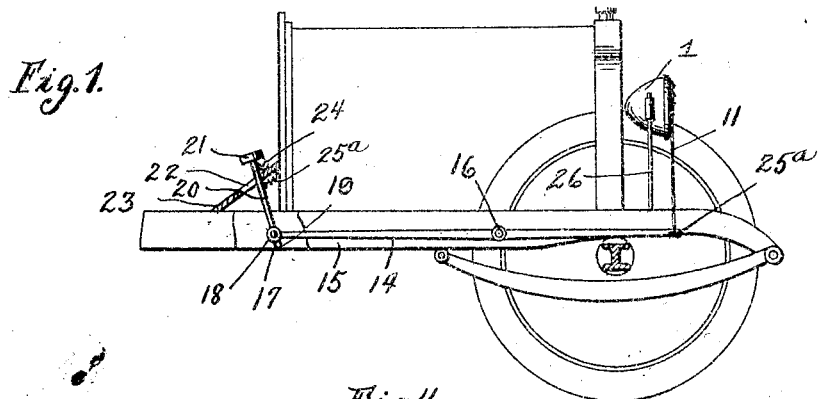
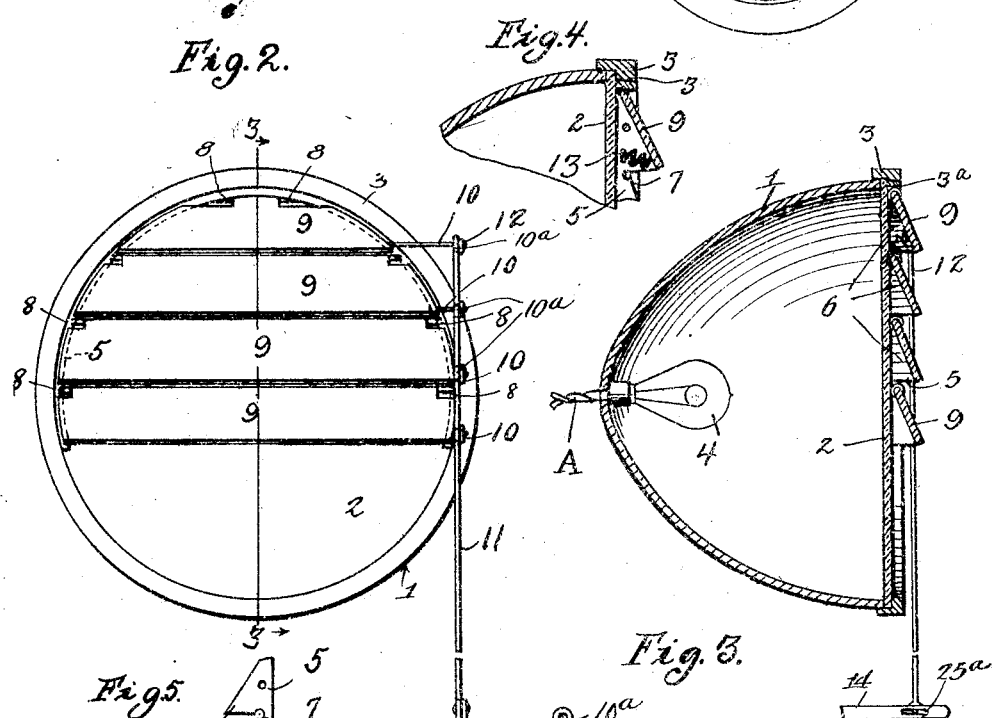
WITNESSES
Arthur K Moore
H. H. Babcock
INVENTOR
Henry D. Bryant
BY
Richard B. Owen
ATTORNEY

UNITED STATES PATENT OFFICE.

HENRY D. BRYANT, OF SPRINGFIELD, MASSACHUSETTS.

LIGHT-REGULATING MEANS.

1,237,467.

Specification of Letters Patent.

Patented Aug. 21, 1917.

Application filed January 30, 1917. Serial No. 145,491.

*To all whom it may concern:*

Be it known that I, HENRY D. BRYANT, a citizen of the United States, residing at Springfield, in the county of Hampden and State of Massachusetts, have invented certain new and useful Improvements in Light-Regulating Means, of which the following is a specification.

This invention relates to light regulating means, and more particularly to means for regulating or controlling the light of an automobile lamp so as to permit dimming of the same.

One of the main objects of the invention is to provide regulating means for an automobile lamp of very simple construction having few parts, which may be quickly and easily applied to a lamp of standard construction. A further object is to provide means which may be attached to a lamp for deflecting the light rays downward at an angle so as to light an area in front of the automobile but prevent the light rays from the upper portion of the lamp from traveling in horizontal lines, so as to eliminate the objectionable glare incident to the use of the ordinary head light. A still further object is to provide means whereby, when desired, the light rays from the upper portion of the lamp may be permitted to flow in substantial horizontal lines thus permitting the light to be projected a considerable distance in advance of the automobile or, in effect, turning on the head light with full power. Further objects will appear from the detail description.

In the drawings:—

Figure 1. is a fragmentary side view of an automobile with a light provided with my dimming device applied, Fig. 2 is a front view of a lamp with my device applied, Fig. 3 is a section taken on line 3—3 of Fig. 2, Fig. 4 is a fragmentary detail of the means for holding the deflecting shutters in lowered position, Fig. 5 is a fragmentary detail of the shutter supporting frame, Fig. 6 is a detail of the shutter operating rod.

The lamp in connection with which my device is used is of standard construction having the body 1 with an inner parabolic reflecting surface, the lens 2, and the flanged securing ring 3 threaded on the front end of the body and serving to secure the lens in position. A suitable electric light 4 or the like is mounted at the apex of the body 1 and is connected by a cable 5 to a suitable source of supply of electrical energy.

The outer flange 3ª of securing ring 3 extends inward peripherally of the front of the lamp. An approximately semi-circular shutter-supporting frame 5 is secured in the upper half of ring 3 to the inner face of flange 3ª. This supporting frame is provided with a plurality of integral downwardly and outwardly inclined members or steps 6. At the point of juncture between the steps the supporting frame is provided with a recess 7. The steps 6 are disposed in pairs in alinement transversely of the frame 5. The recesses 7 receive lugs or gudgeons 8 provided at the upper corners of the shutters 9, the gudgeons of each shutter being seated in recesses which are in alinement transversely of the frame, the shutters thus being pivotally mounted in the frame in horizontal position so as to be rockable about their pivotal axes. In the construction shown I employ four shutters which decrease in length toward the top of the lamp, these shutters having their ends curved on arcs corresponding approximately to the radius of the frame 5, the upper shutter 9 having its upper edge curved on this arc. These shutters are adapted to substantially cover or close somewhat more than half of the lamp, as shown.

Each of the shutters 9 is provided at one end, with an outwardly extending finger 10. This finger is loosely secured through an eye 10ª formed in an operating rod 11, a collar 12 being secured on each finger beyond this rod so as to prevent withdrawal of the finger. By this means, when any one of the shutters 9 is removed the other shutters will be similarly and simultaneously actuated. A coil tension spring 13 is secured to the uppermost shutter 9 at its outer end and has its inner end secured through an eye 13 formed on the shutter supporting frame 5. This spring acts to normally hold shutter 9 rocked downward about its pivotal axis, the remaining shutters being also held downward due to the connection between the shutters. The shutters are of such length as to engage the steps 6 of the frame 5 when in lowered position, these members thus acting to positively limit downward movement of the shutters normally maintaining them at a downward and forward inclination and in spaced relation, as shown in Fig. 3 of the drawings. In this position the shutters act to direct the light rays downward at a considerable angle so as to brilliantly illuminate a small area in advance of the automobile but prevent the light rays from traveling in substantial horizontal lines as is the case where a deflector of this sort is not provided. The light rays from the portion of the lamp below the shutters will be projected in horizontal lines in the usual manner, the object of the shutters being to reduce the height to which this light rays will be projected horizontally to approximately four feet or less thus preventing the momentary blinding of persons in approaching vehicles due to the glare of the head light and the numerous accidents consequent upon this glare. By this means, a portion of the light may be projected a considerable distance ahead of the vehicle along the surface upon which the automobile is traveling, while all danger of blinding persons in approaching vehicles due to the glare of the head light is eliminated. The shutters are held normally depressed or lowered so as to dim the lamp as is required when traveling in cities or when approaching vehicles traveling in the opposite direction or toward the automobile.

By forcing the operating rod 11 upward the shutters 9 may be rocked upward about their pivotal axes so that the body of each shutter extends in substantially a horizontal plane. When the shutters are thus raised the light from the upper portion of the lamp may flow between the shutters along substantially horizontal lines so as to be projected a considerable distance in advance of the vehicle thus, in effect turning the lamp on with full power. Various means may be provided for raising the operating rod 11, but I prefer to have a foot lever or the equivalent mounted on the foot board of the vehicle so as to be easily accessible by means of which the operating rod may be actuated. For this purpose I provide a lever 14 which is pivoted intermediate its ends to the side bar 15 of the automobile as at 16. The inner end of this lever is provided with an integral eye 17 which receives a transverse rod 18 rotatably mounted therein, this rod projecting through a slot 19 in each of the side bars of the automobile frame. A foot rod 20 is pivotally connected at its lower end to the rod 18 being provided at its upper end with a suitable head or plate 21. This foot rod projects through an opening 22 through the foot board 23 of the automobile and is provided with a forwardly projecting upwardly turned finger 24. A tension spring 25 acts to normally force the foot rod 20 forward. By depressing this foot rod the rod 18 will be depressed thus rocking the lever 14 about its pivotal axis so as to cause upward movement of the lever. When the foot rod is thus depressed, the finger 24 will engage under the foot board 23 so as to maintain the lever 14 in this position. The outer end of lever 14 is connected to the lower end of operating rod 11 by pin and slot connections as at 25ª. The automobile will be, of course, provided with two head lights one at each side supported by a suitable fork or standard 26, a dimming apparatus being provided for each light, and a lever 14 being provided at each side of the automobile for operating the dimming apparatus, the inner end of these levers being connected by the cross rod 18 which extends through the side members of the frame for this purpose. By this means the shutters 9 may be quickly and easily rotated upward so as to turn the head lights on with full force, when desired, and maintained in this position, and may be as quickly and easily lowered so as to dim the light.

A dimming apparatus constructed in accordance with my invention may be quickly and easily applied to any automobile lamp of standard construction. It is composed of a minimum of parts, is of very simple construction, and may be produced at relatively small cost. It will be evident that there may be slight changes made in the construction and arrangement of the different parts of my invention without departing from the field and scope of the same, and I intend to include all such variation as fall within the scope of the appended claims, in this application in which a preferred form only of my invention is disclosed.

What I claim is:—

1. In light regulating means, a lamp, a shutter supporting frame secured on said lamp at the front thereof, a plurality of shutters rockably mounted in the frame, means for normally rocking the shutters downward, said frame being provided with members formed integral therewith for engaging the shutters so as to positively limit the downward movement thereof and normally maintain the shutters at a downward and forward inclination, and means for rocking the said shutters upward.

2. In light regulating means, a lamp, a shutter supporting frame secured in the lamp at the front thereof and provided with a plurality of downwardly and forwardly inclined members, shutters rockably mounted in said frame adjacent the apexes of each alined pair of said inclined members and adapted to engage with said members so as to have their downward movement positively limited, means for rocking the shutters downward, and means for rocking said shutters upward into substantially horizontal planes.

3. In light regulating means, a lamp, a shutter supporting frame secured in the lamp at the front thereof and provided with a plurality of downwardly and forwardly inclined members, shutters rockably mounted in said frame adjacent the apexes of each alined pair of said inclined members and adapted to engage with said members so as to have their downward movement positively limited thereby, an operating rod pivotally secured to each of the shutters in advance of the pivotal axis thereof, means connected to one of the shutters and the supporting frame for rocking the shutters downward, and means for raising the operating rod and maintaining it in raised position.

4. A dimmer attachment for automobile lamps comprising a shutter supporting frame adapted to be secured in a lamp and having a plurality of downwardly and forwardly directed shutter engaging members, shutters rockably supported in said frame and adapted to engage said shutter engaging members so as to have their downward movement positively limited thereby, a tension spring secured to one of the shutters and to the said supporting frame and acting to normally hold the shutter in lowered position, and an operating rod pivotally connected to each of said shutters in advance of the pivotal axis thereof.

In testimony whereof I affix my signature in presence of two witnesses.

HENRY D. BRYANT.

Witnesses:
HUGH J. McINTYRE,
CHARLES M. KELLY.